United States Patent [19]

Gessinger et al.

[11] 4,380,574

[45] Apr. 19, 1983

[54] HIGH-DAMPING COMPOSITE MATERIAL

[75] Inventors: Gernot Gessinger, Birmenstorf; Olivier Mercier, Ennetbaden, both of Switzerland

[73] Assignee: BBC Brown, Boveri & Company, Ltd., Baden, Switzerland

[21] Appl. No.: 40,532

[22] Filed: May 21, 1979

Related U.S. Application Data

[62] Division of Ser. No. 882,227, Feb. 28, 1978, abandoned.

[30] Foreign Application Priority Data

May 9, 1977 [CH] Switzerland .................. 5756/77

[51] Int. Cl.³ .......................... B32B 15/01; C25D 5/26
[52] U.S. Cl. .................................. 428/686; 204/43 T; 427/405; 428/679
[58] Field of Search ............... 428/678, 686, 679; 427/405; 204/43 T

[56] References Cited

FOREIGN PATENT DOCUMENTS 139210  9/1947  Australia .

OTHER PUBLICATIONS

Gessinger et al., Z Metallkde, Bd 70 (1979), pp. 135-141.
Sugimoto, K., Mem. Inst. Sci. Ind. Res., Osaka U., 35 (1978), pp. 31-44.

Primary Examiner—M. J. Andrews
Attorney, Agent, or Firm—Oblon, Fisher, Spivak, McClelland & Maier

[57] ABSTRACT

A high-damping composite material, which consists of a metal or metal alloy base material having poor damping properties which determines the strength and shape of said material, and a metal or metal-alloy surface layer surrounding said base material on all sides which has high mechanical damping properties.

8 Claims, 6 Drawing Figures

HIGH-DAMPING COMPOSITE MATERIAL

This is a division, of application Ser. No. 882,227, filed Feb. 28, 1978, now abandoned.

BACKGROUND OF THE INVENTION

1. Field of the Invention

This invention relates to a high-damping composite material comprising metals or alloys; its manufacture and use.

2. Description of the Prior Art

In machine design, particularly in the construction of rotary thermal machines, the question of damping capacity of the material's construction, which are highly stressed mechanically and thermally, is a recurring problem. The greater the damping capacity of the material, and of the component manufactured therefrom, the longer the expected life in operation—with the properties and conditions being otherwise the same. In practice, attempts are made to increase the damping of a machine element by constructional measures and also by measures relating to material technology. Numerous attempts are documented in the literature. Special dampers are built into the machine element or the latter is manufactured completely from a damping material. Laminated materials are also used, a poorly damping base material being provided with a non-metallic damping coating. On the material side it is known that certain alloys, such as 12% Cr steel or NIVCO 10 (Westinghouse) have good magnetoelastic damping. These also include other ferromagnetic alloys (for example, A. W. Cochardt, High-damping ferromagnetic alloys, Transactions AIME, Journal of Metals, October 1956, page 1295-1298; U.S. Pat. Nos. 2,829,048, 2,981,620 and 3,486,886). Special damper designs are also known (for example, D. I. G. Jones, A. D. Nashif and M. Stargardter, Vibrating beam dampers for reducing vibrations in gas turbine blades, ASME publication, Paper No. 74-GT-95, presented at Gas Turbine Conference Zurich, Switzerland, Mar. 31 to Apr. 4, 1974; U.S. Pat. No. 3,601,228).

Highly stressed components of thermal machines, in particular gas turbines, demand materials having a high continuous creep strength and fatigue resistance at high temperature. 12% Cr steel has a comparatively low hot strength at 600° C. and the NIVCO 10 alloy (Westinghouse) is prone to fatigue cracks at this temperature due to the precipitation of a brittle phase comprising intermettalic compounds. It is expensive to build special damping elements into machine components and this limits the design options for the machine components which are already restricted by operational considerations. It is necessary here to match elements of this type, which in most cases are provided with a viscoelastic enamal layer to the specific resonant range occurring in the operation of the machine component. Moreover, the combination of a metallic base material, for example a super alloy, with a non-metallic glassy layer, for example, enamel, cannot be regarded as ideal because of the large differences in their chemical and physical properties. Thus, a need exists for machining components simultaneously possessing good mechanical and thermal strength and good damping properties.

SUMMARY OF THE INVENTION

It is the object of the invention to provide materials and processes for the manufacture thereof, which possess high material damping under all, even variable, operating conditions, coupled with high strength over the entire range of mechanical and thermal stresses, and which at the same time allow the greatest possible freedom of construction design.

These and other objects of the invention have been achieved when the composite material of the type comprising a base material having poor damping characteristics but which determine the strength and the shape of the machine component, and a surface layer surrounding, as an envelope, the base material on all sides which has high mechanical damping properties.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRPTION OF THE PREFERRED EMBODIMENTS

Figure 1:
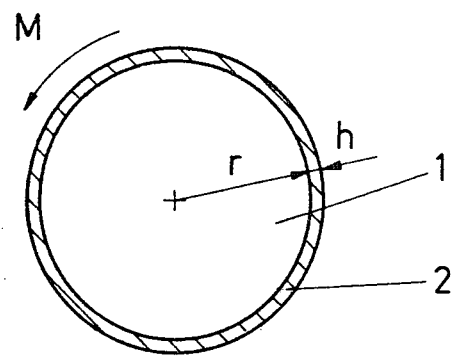
FIG. 1 illustrates the cross-section through a torsion bar of composite material.

According to this invention, the composite material is manufactured by first fabricating the base material into its final shape by casting, hot-forming or cold-forming, mechanical working or by powder metallurgy, and subsequently applying the damping surface layer to the base material.

The guiding concept on which the invention is based is a separation of objectives in material technology by providing a core of material of high hot strength, which adsorbs the entire mechanical stress, and a surface layer having high mechanical damping and a large surface. A particularly effective material for the latter proves to be a ferromagnetic material of high Curie point so that the good damping properties are preserved even at high operating temperatures. For lower operating temperatures, it is advantageously possible to use alloys, so-called memory alloys, which have undergone a martensitic phase transformation and which exhibit a similar good damping behavior.

The base material preferably comprises a suitable metal or alloy having the necessary properties for the expected service the machine component will be subjected to. The damping surface layer preferably comprises a metal or alloy having good damping properties at the operating temperature or temperatures to which the machine component will be subjected.

The base metal or alloy may be any having the necessary characteristics of strength, fatigue resistance over the range of operating conditions which the component will be subjected to. Such material include ferrous alloys, steels, super alloys, titanium alloys and the like. Illustrative of such materials are steels which are non-magnetic at the operating conditions of the component such as austenitic steel having good strength characteristics at elevated temperatures. The super alloys are well-known in the art and include those based on nickel or cobalt.

Metals and alloys useful for the damping layer include all the known metals and alloys having good damping properties. Such materials include magneto-elastically damping materials, ferrmagnetic alloys, ferritic alloy steels, memory alloys, alloys which have undergone a martensitic transformation and the like. Illustrative of such materials are chrome steels such as 13% chrome steel, cobalt-nickel alloys such as those containing 40–80 wt. % Co and 20–60 wt. % Ni, cobalt-nickel-iron alloys such as those containing 40–80 wt. % Co, 0–20 wt. %, Fe, and 20–60 wt. % Ni. Also suitable are cobalt-iron alloys such as those containing 50–90 wt. % Co and 10–50 wt. % Fe. Also finding applications as the damping alloy are cobalt-iron-nickel alloys such as those containing 50–90 wt. % Co, 10–50 wt. % Fe and 0–20 wt. % Ni. Illustrative of the conventional memory alloys are the NiTi type, NiTi type containing copper or other NiTi or NiTi-Co containing which contain additional alloying elements. Other suitable memory alloys include those based on Co-Zn-Al.

As can be seen, essentially any known damping material may be used in this invention as the damping layer. The base material like-wise may be any material having the necessary mechanical and thermal strength properties.

The damping layer need only be thick enough to achieve the necessary damping effect. This layer may comprise 0.5% or less by volume of the total volume of the component or up to 20% volume & or even more of the total volume of the component. Generally damping layers comprising from about 0.5 to 20 volume % have proven satisfactory.

FIG. 1 illustrates the principal build-up of the composite material with the aid of a cross-section through a torsion bar. 1 is the core consisting of the high temperature-resistant base material, whilst 2 denotes the high-damping ferromagnetic surface layer. M indicates the torsional moment acting on the bar. The base material 1 has a radius r and the surface layer 2 has a thickness h.

Having generally described this invention, a further understanding can be obtained by reference to certain specific examples which are provided herein for purposes of illustration only and are not intended to be limiting unless otherwise specified.

EXAMPLE 1

A torsion bar (wire) of 3 mm φ (r=1.5 mm) consisting of a high temperature-resistant steel as the base material 1 was provided with a surface layer 2 of a thickness of h=30 μm. The base material 1 here had the following composition (corresponding to DIN X 12 Cr Ni W Ti 1613):

Ni: 13–16%
Cr: 15.5–18%
W: 2.5–4%
Ti: maximum 1%; minimum 5×%C
C: 0.08–0.15%
Si: maximum 0.8%
Mn: maximum 1%
P: about 0.01%
S: about 0.01%
Mo: maximum 0.5%

The surface layer 2 represented a cobalt/nickel alloy and was deposited on the base material by electrolytic means. The electrolysis bath had the following composition:

| | | |
|---|---|---|
| $CoCl_2$: | 5 g | |
| $NiCl_2$: | 10 g | Per liter of |
| HCl: | 1 cm$^3$ | distilled $H_2O$ |
| $P_H$: | 1.5–2 | |

The steel used as the ball material was first etched and then preplated electrolytically for 2–3 minutes at a current density of 50 mA/dm$^2$. After removal from the electrolysis bath, the rod was dried and annealed for 3 hours at 700° C. under a hydrogen atmosphere. Subsequently, the rod was electroplated in the same electrolysis bath for 10 hours at a current density of 50 mA/dm$^2$. The deposited layer had a thickness of 30 μm and had a composition of 67 Co/33 Ni. The surface layer 2 thus has a proportion of 4% by volume. It must be pointed out that coatings of different compositions (for example 60 Co/40 Ni or 60 Co/20 Fe/20 Ni or 60 Co/40 Fe) can also be prepared by this method.

The total damping $\delta_{tot}$ of a torsion bar, according to FIG. 1, of composite material can be expressed by the following equation:

$$\delta_{tot} \sim \left(\frac{r}{r+h}\right)^2 \delta_1 + \frac{2h}{r+h} \cdot \delta_2 \text{ (for } \tau_{max}\text{)}$$

$\bar{\delta}_1$ = mean logarithmic decrement of damping for the base material 1

$\delta_2$ = logarithmic decrement of damping for the surface layer 2 at the highest shear stress $\tau_{max}$.

The process described in accordance with this illustrative embodiment does not cover the full extent of the invention. The high-damping surface layer 2 can also be applied by other means than electrolytic means. In particular, the electro-less deposition of Ni/Co alloys from complex salt solutions by means of reducing agents should be mentioned here. As a rule, such baths contain, in a known manner, the chlorides of the metals concerned, organic complex-forming agents and alkali metal borohydrides or similar compounds as the reducing agents. In most cases, stabilizers are also admixed with the baths. The coating of the base material 1 can also be carried out by plasma-spraying of metal and subsequent dense-sintering. A limited duffusion in the boundary zone between the base material 1 and the surface layer 2 is permissible, as long as the layered build-up of the composite material is not impaired thereby. If necessary, an interlayer can be applied beforehand as a diffusion barrier. These considerations are to be taken into account particularly in the last-mentioned coating process.

The invention is not restricted to the ferritic magneto-elastic alloys described in the illustrative embodiment mentioned above. Particularly for relatively low temperatures (about −100° C. to +200° C.), the so-called memory alloys which have undergone an austenitic-martensitic phase transformation can also be used. Examples of such memory alloys are materials built up on the basis of Ni/Ti mixtures, such as the intermetallic compound NiTi itself and related Cu-containing alloys, optionally with further metallic additions. Alloys of this type have a comparatively high internal friction and their logarithmic decrement of damping reaches, for example in the case of the composition of 45% by weight of Ti, 54% by weight of Ni and 1% by weight of Cu, a value of $$\delta_2 = 0.05 \text{ to } 0.1$$

Alloys based on Cu/Zn/Al and related mixtures represent another type of these memory alloys. Their logarithmic decrement, is, for example in the case of the composition of 72.5% by weight of Cu, 21.12% by weight of Zn and 5.83% by weight of Al, of the order of $$\delta_2 = 0.1 \text{ to } 0.2.$$

Figure 2:
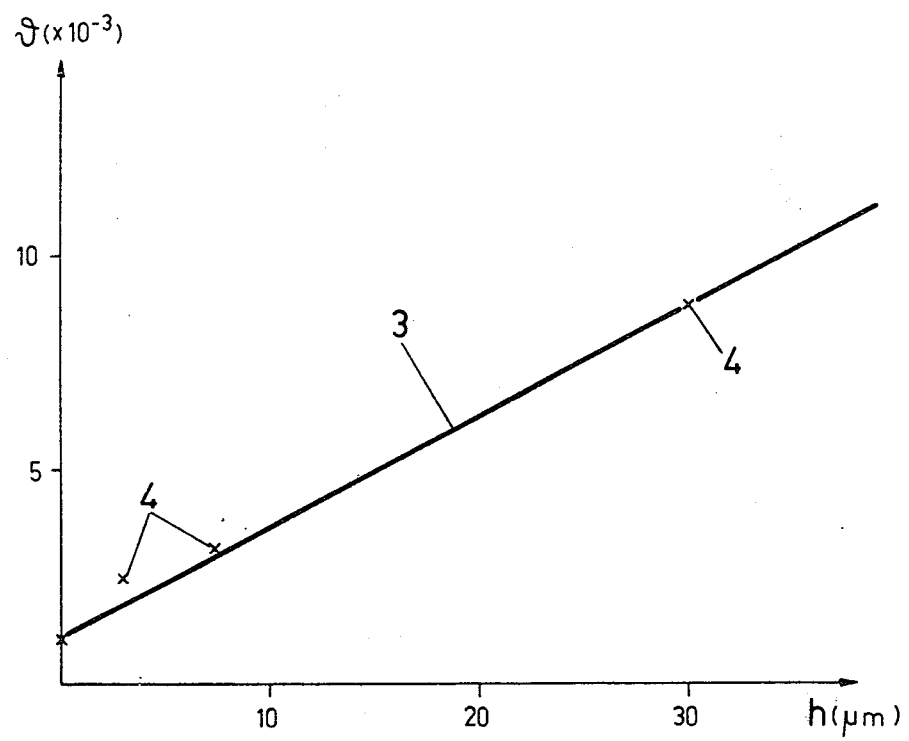
FIG. 2 illustrates the damping as a function of the layer thickness for a torsion bar according to FIG. 1.

FIG. 2 shows graphically the total damping $\delta_{tot}$ (logarithmic decrement) at room temperature, as a function of the layer thickness h, for the torsion bar, described in FIG. 1, of high-damping composite material. The amplitude Y of the torsional vibration here was $5 \cdot 10^{-4}$. Curve 3 illustrates the relationship calculated in accordance with the above equation, while 4 represents the experimetnally determined values in the form of measured points. It can be seen from the diagram that there is good agreement between the calculated and the measured results. It can also be seen from FIG. 2 that the damping capacity of a torsionally stressed wire of 3 mm thickness can be increased to 10 times that of the uncoated material by applying a magneto-elastic layer of only 34 μm thickness.

Figure 3:
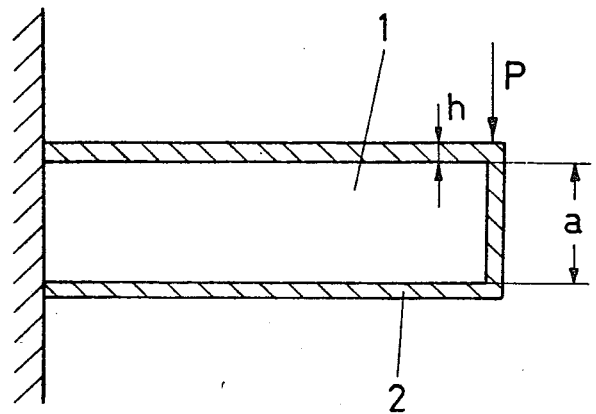
FIG. 3 illustrates the longitudinal section through a flexural bar of composite material.

FIG. 3 shows a longitudinal section through a bar, clamped in on one side and flexurally stressed by the transverse force P, of high-damping composite material. The thickness of the base material 1 is a, while the surface layer 2 has a thickness of h. Using the symbols defined under FIG. 1 for the logarithmic decrement, the following relationships then apply for the total damping $\delta_{tot}$:

$$\delta_{tot} \sim \frac{a}{a + 2h} \cdot \delta_1 + \frac{h}{a + 2h} \cdot \delta_2 \text{ (for } \tau_{max}\text{).}$$

The damping of a rod which is clamped in one side and which carries out a bending vibration, thus still reaches half the value of that in a torsional vibration, provided that the geometric conditions are the same. Since, in most cases, a combined torsional/bending vibration is present in actually constructed machine components (turbine blade), the total values for $\delta_{tot}$, calculated according to FIG. 1 and FIG. 3.

Figure 4:
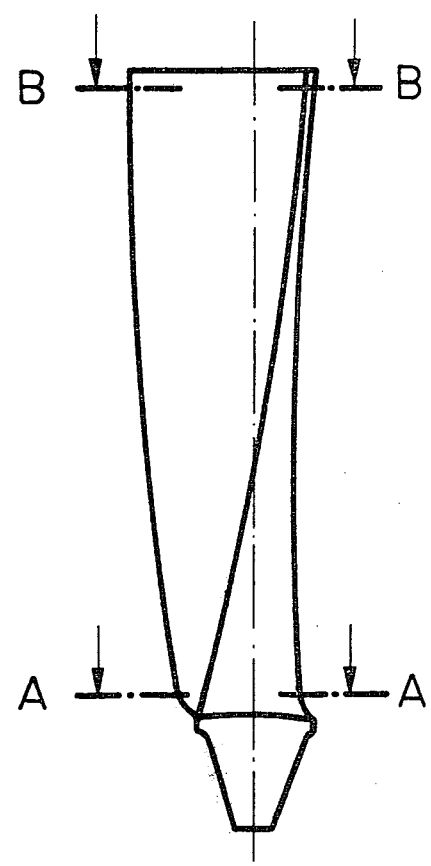
FIG. 4 illustrates a sectional view of a coated turbine blade.
Figure 5:
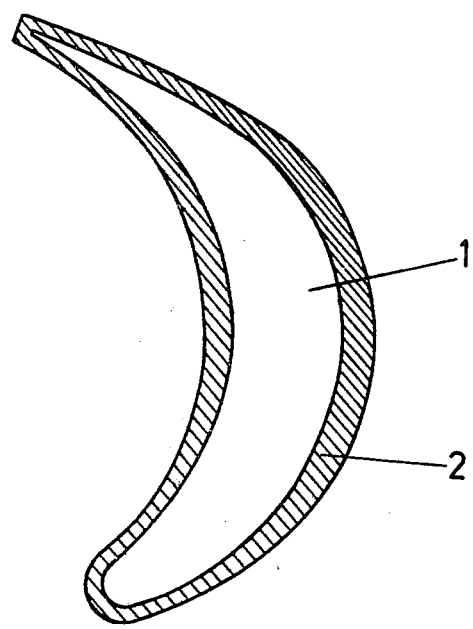
FIG. 5 illustrates the cross-section A—A through a coated turbine blade at the root and FIG. 6 illustrates the cross-section B—B through a coated turbine blade at the tip.
Figure 6:
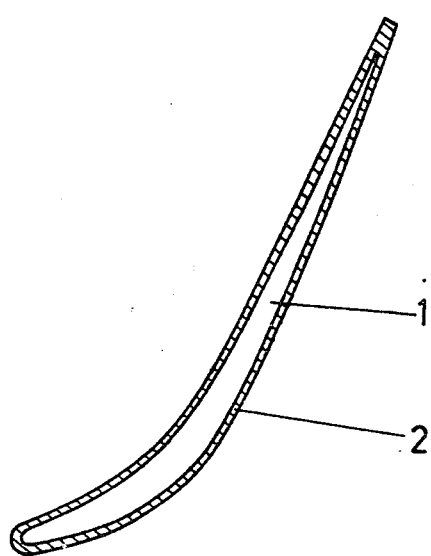

FIGS. 4, 5 and 6 show a sectional view and two cross-sections of a coated turbine blade. Optimum damping conditions for the component can be created with the lowest expenditure and the greatest possible freedom in the constructional design, by selecting a layer thickness, which progressively increases from the tip to the root, for the high-damping surface layer 2.

The present invention is not limited to the illustrative embodiments described previously. In particular, the process can be used in an advantageous manner in the coating of casing components for the purpose of noise abatement (anti-droning coating) at room temperature and at average operating temperatures (several hundred degrees centigrade).

The new composite materials according to the invention provide materials which, coupled with a high continuous creep strength and fatigue resistance at high temperatures, at the same time exhibit excellent damping properties and possess a high resistance to ageing over the entire operating range of mechanical and thermal stresses. The materials do not need to be adapted to discrete operating frequencies and in this manner enable machine components, in particular turbine blades, to be manufactured with the greatest possible construction liberties. Since the properties of the base material are not affected by the coating, the base material can be selected freely and can be matched to the operating requirements to the greatest possible extent. As a result of the layered build-up, using a base material which determines the shape, the manufacturing processes are simple and give clearly reproducible products.

This invention has wide applicability in the manufacture of machine components which are subjected to mechanical or mechanical and thermal stresses. In particular, the technique of this invention may be used to prepare turbine blades, both for gas and steam turbines, compressor blades, wheels for compressors and turbines, thermal machine casings and the like. The component will be fabricated to the desired shape from a suitable metal alloy and then coated with the damping metal or alloy.

Having now fully described this invention, it will be apparent to one of ordinary skill in the art that many changes and modifications can be made thereto without departing from the spirit or scope of the invention set forth herein.

What is claimed as new and intended to be covered by Letters Patent is:

1. A procedure for manufacture of machine components which are highly stressed mechanically and thermally, comprising:
   forming said machine components from a metal or metal alloy base material having poor damping properties which determines the strength and shape of said component; and
   subsequently coating all the surfaces of the resulting component with a metal or metal alloy having high damping characteristics sufficient to improve the lifetime of said machine component.

2. In a machine component subjected to mechanical and thermal stresses, the improvement which comprises:
   said component comprising a structure consisting of a metal or metal alloy base material having poor damping properties which determines the strength and shape of said component and a metal or metal alloy surface layer surrounding said base metal on all sides having high mechanical damping properties sufficient to improve the lifetime of said machine component.

3. The machine component of claim 2, wherein said machine component is a turbine blade.

4. The machine component of claim 2, wherein said machine component is a steam turbine blade.

5. The machine component of claim 2, wherein said machine component is a compressor blade.

6. The machine component of claim 2, wherein said machine component is a compressor wheel.

7. The machine component of claim 2, wherein said machine component is a turbine wheel.

8. The machine component of claim 2, wherein said machine component is a casing part for a thermal machine.

* * * * *